(12) United States Patent
Nishimaki et al.

(10) Patent No.: US 8,382,641 B2
(45) Date of Patent: Feb. 26, 2013

(54) MOTOR GRADER

(75) Inventors: Kazuhito Nishimaki, Komatsu (JP);
Michihiro Aida, Komatsu (JP);
Noritoshi Takekuma, Komatsu (JP);
Osamu Kodama, Komatsu (JP);
Takafumi Takenaka, Komatsu (JP)

(73) Assignee: Komatsu Ltd., Tokyo (JP)

( * ) Notice: Subject to any disclaimer, the term of this patent is extended or adjusted under 35 U.S.C. 154(b) by 309 days.

(21) Appl. No.: 13/002,220

(22) PCT Filed: Jul. 9, 2009

(86) PCT No.: PCT/JP2009/062506
§ 371 (c)(1),
(2), (4) Date: Dec. 30, 2010

(87) PCT Pub. No.: WO2010/016354
PCT Pub. Date: Feb. 11, 2010

(65) Prior Publication Data
US 2011/0118083 A1    May 19, 2011

(30) Foreign Application Priority Data

Aug. 7, 2008   (JP) ................................ 2008-203751
Aug. 25, 2008  (JP) ................................ 2008-215761

(51) Int. Cl.
*F16H 45/02* (2006.01)
*B60W 10/02* (2006.01)
(52) U.S. Cl. ........................................ 477/169; 477/175
(58) Field of Classification Search .................. 477/54, 477/62, 64, 84, 169, 175
See application file for complete search history.

(56) References Cited

U.S. PATENT DOCUMENTS

| 7,530,924 B2 * | 5/2009 | Brevick ........................ 477/176 |
| 2009/0011902 A1 * | 1/2009 | Tomiyama .................... 477/169 |

FOREIGN PATENT DOCUMENTS

| JP | 64-12175 A | 1/1989 |
| JP | 2-245572 A | 10/1990 |
| JP | 5-272636 A | 10/1993 |
| JP | 11-201279 A | 7/1999 |
| JP | 2000-320362 A | 11/2000 |
| JP | 2002-98165 A | 4/2002 |
| JP | 2004-256063 A | 9/2004 |
| JP | 2005-180702 A | 7/2005 |
| JP | 2005-221073 A | 8/2005 |

OTHER PUBLICATIONS

International Search Report of corresponding PCT Application No. PCT/JP2009/062506.

* cited by examiner

*Primary Examiner* — Edwin A Young
(74) *Attorney, Agent, or Firm* — Global IP Counselors

(57) ABSTRACT

A motor grader includes an engine, a torque converter, a drive wheel, an engine revolution detector, and a control unit. The torque converter, including a lock-up clutch, transmits driving force from the engine. The drive wheel is rotationally driven by the driving force from the engine. The engine revolution detector detects engine revolution. When the lock-up clutch is engaged, the control unit is configured to: maintain the engaged state of the lock-up clutch when the engine revolution is greater than a predetermined lock-up release revolution lower than a low idle revolution; and switch the lock-up clutch into a disengaged state when the engine revolution is less than or equal to the predetermined lock-up release revolution.

4 Claims, 4 Drawing Sheets

MOTOR GRADER

CROSS-REFERENCE TO RELATED APPLICATIONS

This national phase application claims priority to Japanese Patent Application No. 2008-203751 filed on Aug. 7, 2008, and Japanese Patent Application No. 2008-215761 filed on Aug. 25, 2008. The entire disclosure of Japanese Patent Application Nos. 2008-203751 and 2008-215761 is hereby incorporated herein by reference.

TECHNICAL FIELD

The present invention relates to a motor grader.

BACKGROUND ART

The motor graders of some types include a torque converter provided with a lock-up clutch (see Japan Laid-open Patent Application Publication No. JP-A-2000-320362). When the lock-up clutch in such a motor grader is set to be in an engaged state, an operator can feel a direct speed control that the vehicle speed is changed in accordance with an acceleration control by the operator. When the lock-up clutch is set to be in an engaged state, however, the input side and the output side of a torque converter are set to be in a directly engaged state. Therefore, an engine stall may be caused when a large load is applied to the output side.

Meanwhile, Japan Laid-open Patent Application Publication No. JP-A-H05-272636 describes a technology of a large agricultural tractor for avoiding occurrence of an engine stall, although this is not related to the motor graders. In the technology, the lock-up clutch is changed into a disengaged state when the revolution of an input shaft in the lock-up clutch becomes less than or equal to an engine idle revolution (i.e., a low idle revolution) during an engaged state of the lock-up clutch. Accordingly, occurrence of an engine stall is avoided.

SUMMARY

Unlike the aforementioned large agricultural tractor, the motor graders are required to travel at an engine revolution lower than or equal to a low idle revolution in executing operations such as a land shaping. If an engine stall avoidance control is executed for the motor graders during low speed travelling similarly to the aforementioned large agricultural tractor, the lock-up clutch is changed into a disengaged state. This may deteriorate an operator's speed control feeling.

It is an object of the present invention to provide a motor grader configured to avoid occurrence of an engine stall without deteriorating a speed control feeling of an operator during low speed travelling.

A motor grader according to a first aspect of the present invention includes an engine, a torque converter, a drive wheel, an engine revolution detector, and a control unit. The torque converter includes a lock-up clutch. The torque converter is configured to transmit driving force from the engine. The drive wheel is configured to be rotationally driven by the driving force from the engine. The engine revolution detector is configured to detect an engine revolution. The control unit is configured to keep an engaged state of the lock-up clutch when the engine revolution is greater than a predetermined lock-up release revolution lower than a low idle revolution under a condition that the lock-up clutch is set to be in the engaged state. Further, the control unit is configured to switch the lock-up clutch into a disengaged state when the engine revolution is less than or equal to the predetermined lock-up release revolution.

According to the motor grader of the first aspect of the present invention, the engaged state of the lock-up clutch is kept until the engine revolution is reduced to the lock-up release revolution even when the engine revolution is reduced to a revolution lower than the low idle revolution during low speed travel. Therefore, the motor grader can travel at low speed without deteriorating a speed control feeling of an operator. Further, when the engine revolution becomes less than or equal to the lock-up release revolution, the lock-up clutch is changed into the disengaged state. Occurrence of an engine stall can be thereby avoided.

A motor grader according to a second aspect of the present invention relates to the motor grader according to the first aspect of the present invention. In the motor grader, the torque converter further includes a damper configured to inhibit vibration of the engine. Further, the lock-up release revolution is greater than a resonance revolution of the damper.

According to the motor grader of the second aspect of the present invention, the lock-up clutch is changed into a disengaged state before the engine revolution is reduced to the resonance revolution of the damper. Accordingly, it is possible to avoid vibration of a vehicle body to be caused by reduction in the engine revolution.

ADVANTAGEOUS EFFECTS OF INVENTION

According to the motor grader of the present invention, occurrence of an engine stall can be avoided without deteriorating an operator's speed control feeling during low speed travelling.

DESCRIPTION OF EMBODIMENTS

Overall Structure

Figure 1:
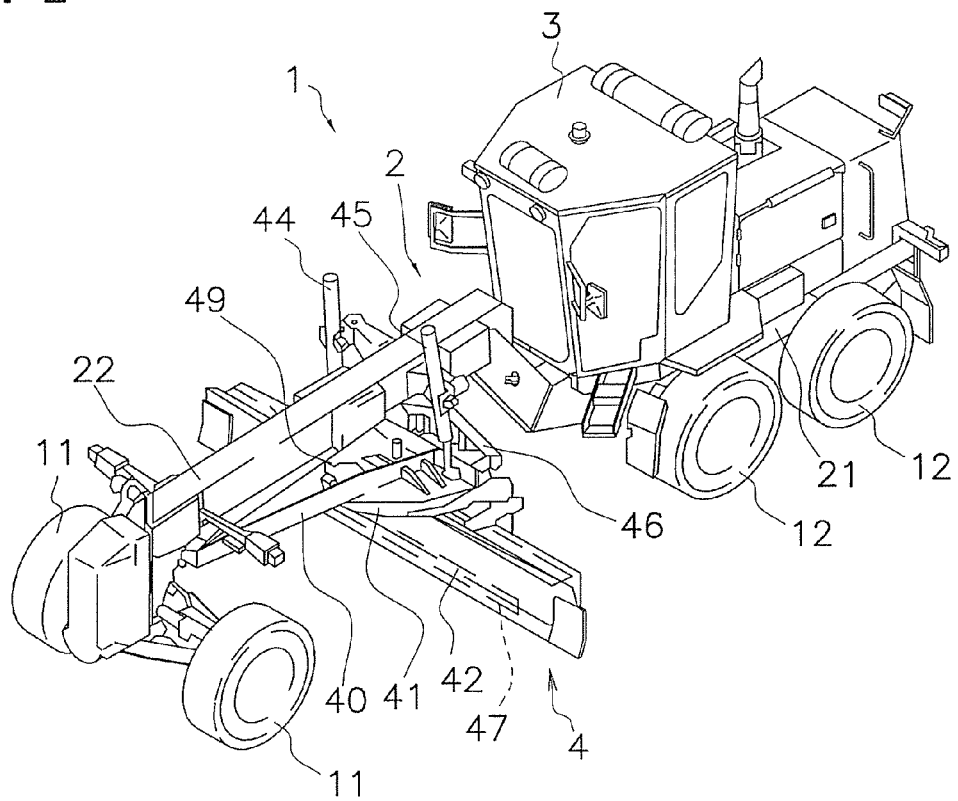
FIG. 1 is an external perspective view of a motor grader.
Figure 2:
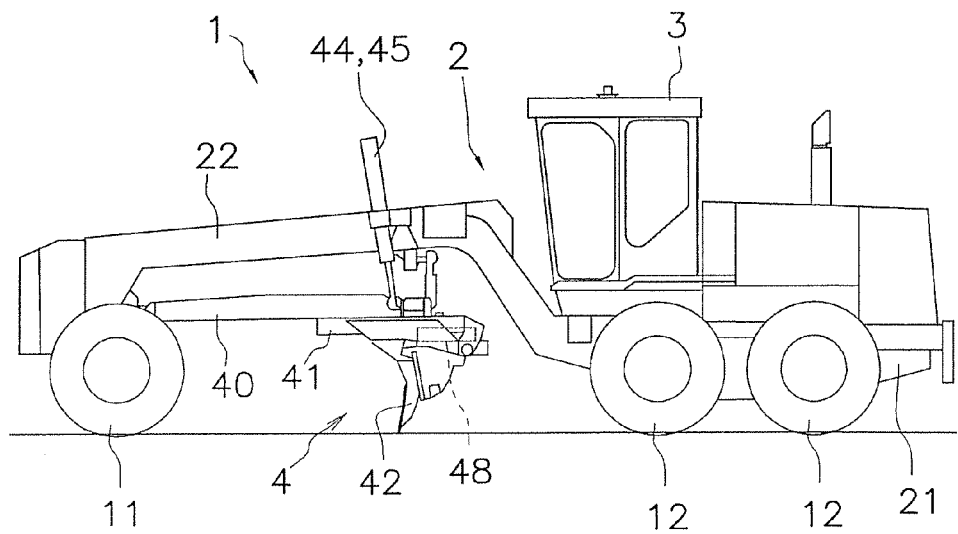
FIG. 2 is a side view of the motor grader.

FIG. 1 illustrates an external perspective view of a motor grader 1 according to an exemplary embodiment of the present invention, whereas FIG. 2 illustrates a side view of the motor grader 1. The motor grader 1 includes totally six travelling wheels. Specifically, the motor grader 1 includes a pair of a right front wheel 11 and a left front wheel 11, and two pairs of a right rear wheel 12 and a left rear wheel 12 (i.e., two rear wheels 12 on each side). The motor grader 1 includes a blade 42 disposed longitudinally between the front wheels 12 and the rear wheels 12 for executing a variety of operations such as land shaping, snow removal, light cutting and material mixture. It should be noted that FIGS. 1 and 2 illustrate only the left rear wheels 12 of the four rear wheels 12.

Figure 3:
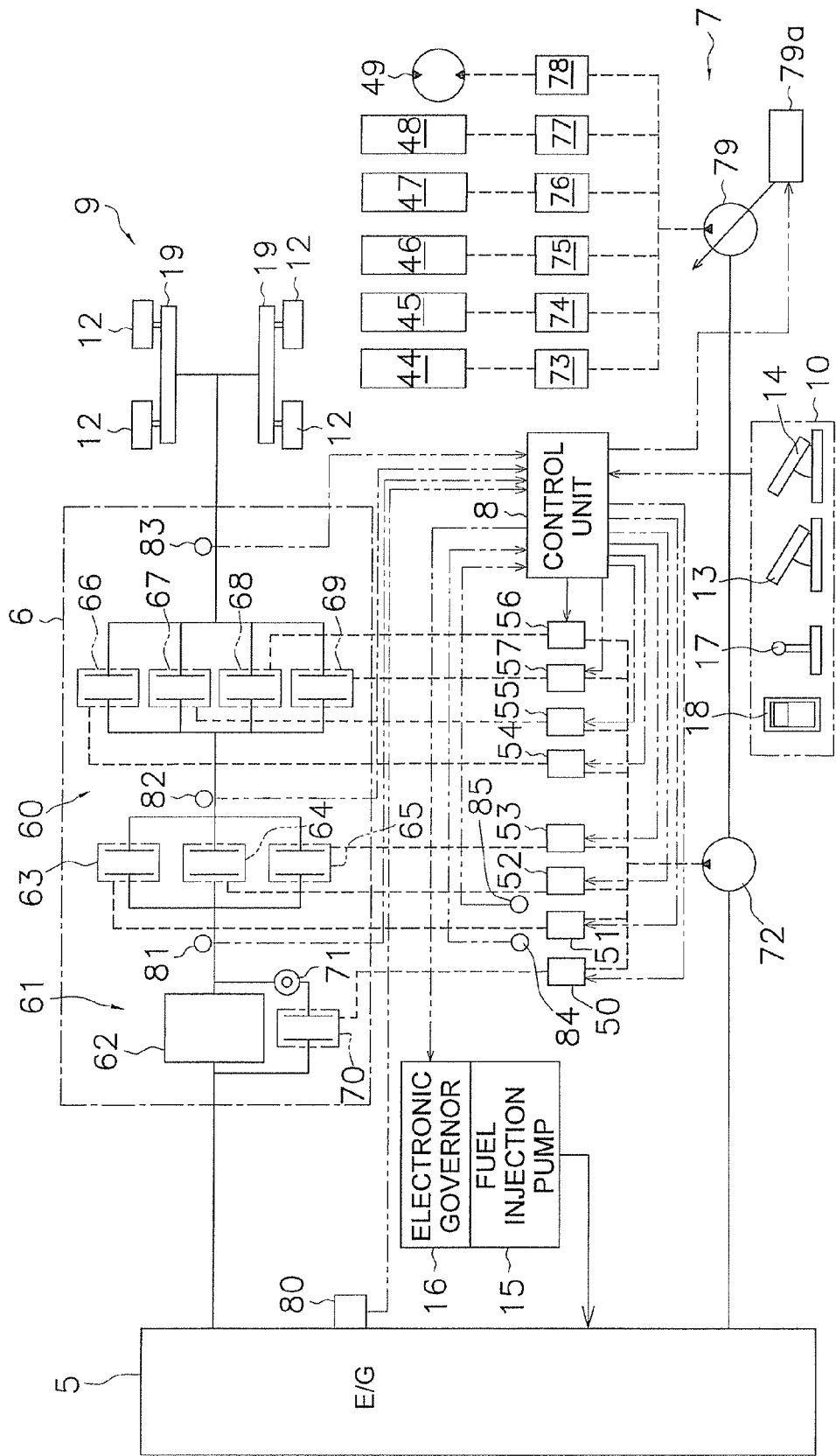
FIG. 3 is a configuration block diagram of the motor grader.

As illustrated in FIGS. 1 and 2, the motor grader 1 includes a frame 2, a cab 3, and a working equipment 4. As illustrated in FIG. 3, the motor grader 1 further includes an engine 5, a power transmission mechanism 6, a travel mechanism 9, a hydraulic drive mechanism 7, an operation unit 10, a control unit 8, and the like.

Frame 2 and Cab 3

As illustrated in FIGS. 1 and 2, the frame 2 includes a rear frame 21 and a front frame 22.

The rear frame 21 contains components illustrated in FIG. 3 such as the engine 5, the power transmission mechanism 6, and the hydraulic drive mechanism 7. Further, the rear frame 21 is provided with the aforementioned four rear wheels 12. The vehicle is allowed to travel when the rear wheels 12 are rotationally driven by means of driving force from the engine 5.

The front frame 22 is attached to the front side of the rear frame 21. The aforementioned front wheels 12 are attached to the front end of the front frame 22.

The cab 3 is mounted on the rear frame 21. The cab 3 includes an operation unit (see FIG. 3) in the inside thereof. The operation unit includes a handle, a gear shift lever, an operation lever for operating the working equipment 4, a brake pedal, an accelerator pedal 14, an inching pedal 13, and the like. It should be noted that the cab 3 may be mounted on the front frame 22.

Working Equipment 4

The working equipment 4 includes a drawbar 40, a circle 41, the blade 42, a hydraulic motor 49, a variety of hydraulic cylinders 44 to 48, and the like.

The front end of the drawbar 40 is pivotably attached to the front end of the front frame 22. The rear end of the drawbar 40 is configured to be lifted or lowered in conjunction with synchronous compression/decompression of a pair of a lift cylinder 44 and a lift cylinder 45. Further, the drawbar 40 is configured to pivot up and down about an axis arranged along a vehicle travel direction in conjunction with unsynchronous compression/decompression of the lift cylinders 44, 45. Yet further, the drawbar 40 is configured to move right and left in conjunction with compression/decompression of the drawbar shift cylinder 46.

The circle 41 is rotatably attached to the rear end of the drawbar 40. The circle 41 is configured to be driven by the hydraulic motor 49 (see FIG. 1). The circle 41 is configured to rotate in a clockwise/counterclockwise direction with respect to the drawbar 40 seen from the above of the vehicle.

The blade 42 is supported while being configured to be transversely slidable with respect to the circle 41 and pivotable up and down about an axis arranged in parallel to a transverse direction. The term "transverse direction" herein refers to a right and left direction with respect to the vehicle travel direction. The blade 42 is allowed to transversely move with respect to the circle 41 by means of the blade shift cylinder 47 supported by the circle 41. Further, the blade 42 is configured to pivot about an axis arranged in parallel to the transverse direction by means of the tilt cylinder 48 (see FIG. 2) supported by the circle 41. The blade 42 is thereby allowed to change the orientation thereof with respect to the circle 41 in an up and down direction (i.e., a vertical direction). As described above, the blade 42 is configured to perform the following actions through the drawbar 40 and the circle 41: upward and downward movements with respect to the vehicle; tilt change with respect to the vehicle travel direction; tilt change with respect to the transverse direction; rotation; and shift in the right and left direction.

The hydraulic motor 49 is configured to be driven by means of hydraulic oil to be supplied thereto from a first hydraulic pump 79 to be described for rotating the circle 41.

A variety of the hydraulic cylinders 44 to 48 are cylinders to be driven by means of hydraulic oil to be supplied thereto from the first hydraulic pump 79. As described above, a variety of the hydraulic cylinders 44 to 48 are, for instance, a pair of the lift cylinders 44, 45, the drawbar shift cylinder 46, the blade shift cylinder 47, and the tilt cylinder 48. The lift cylinders 44, 45 are transversely separated from each other through the front frame 22. The lift cylinders 44, 45 are disposed roughly along the vertical direction. The lift cylinders 44, 45 are attached to the front frame 22 and the drawbar 40. The lift cylinders 44, 45 are configured to be compressed and decompressed for vertically moving the rear end of the drawbar 40. Accordingly, the blade 42 is allowed to move up and down. The drawbar shift cylinder 46 is slanted with respect to the vertical direction. The drawbar shift cylinder 46 is attached to the front frame 22 and the lateral end of the drawbar 40. The drawbar shift cylinder 46 is configured to be compressed and decompressed for changing the position of the drawbar 40 with respect to the transverse direction. Accordingly, the position of the blade 42 is configured to be changed. The blade shift cylinder 47 is disposed along the longitudinal direction of the blade 42. The blade shift cylinder 47 is attached to the circle 41 and the blade 42. The blade shift cylinder 47 is configured to be compressed and decompressed for changing the longitudinal position of the blade 42. The tilt cylinder 48 is attached to the circle 41 and the blade 42. The tilt cylinder 48 is configured to be compressed and decompressed for pivoting the blade 42 up and down about the axis arranged along the transverse direction. Accordingly, the slanted angle of the blade 42 is configured to be changed with respect to the vehicle travel direction.

Engine 5

As illustrated in FIG. 3, the engine 5 is additionally provided with a fuel injection pump 15. The fuel injection pump 15 is configured to supply fuel to the engine 5. The amount of fuel supply is controlled by a command signal to be outputted to an electronic governor 16 from the control unit 8 to be described. It should be noted that revolution of the engine 5 is detected by an engine revolution sensor 80 and then transmitted to the control unit 8 as a detection signal. The control unit 8 transmits the command signal to the electronic governor 16 for controlling the amount of fuel to be supplied to the engine 5. Consequently, the revolution of the engine 5 can be controlled.

Power Transmission Mechanism 6

The power transmission mechanism 6 is a mechanism configured to transmit the driving force from the engine 5 to the rear wheels 12. The power transmission mechanism 6 includes a torque converter 61 and a transmission 60.

The torque converter 61 is connected to the output side of the engine 5. The torque converter 61 is provided with a lock-up clutch 70 configured to directly engage an input shaft and an output shaft of the torque converter 61. The lock-up clutch 70 is configured to be switched between an engaged state and a disengaged state. When the lock-up clutch 70 is set to be in the engaged state, the input side and the output side of the torque converter 61 is directly engaged. Accordingly, the driving force from the engine 5 is transmitted to the torque converter 61 without intervention of a torque converter mechanism 62. In contrast, the driving force from the engine 5 is transmitted to the torque converter 61 through the torque converter mechanism when the lock-up clutch 70 is set to be in the disengaged state.

More specifically, the torque converter 61 includes the torque converter mechanism 62, the lock-up clutch 70, and a damper 71.

Figure 4:
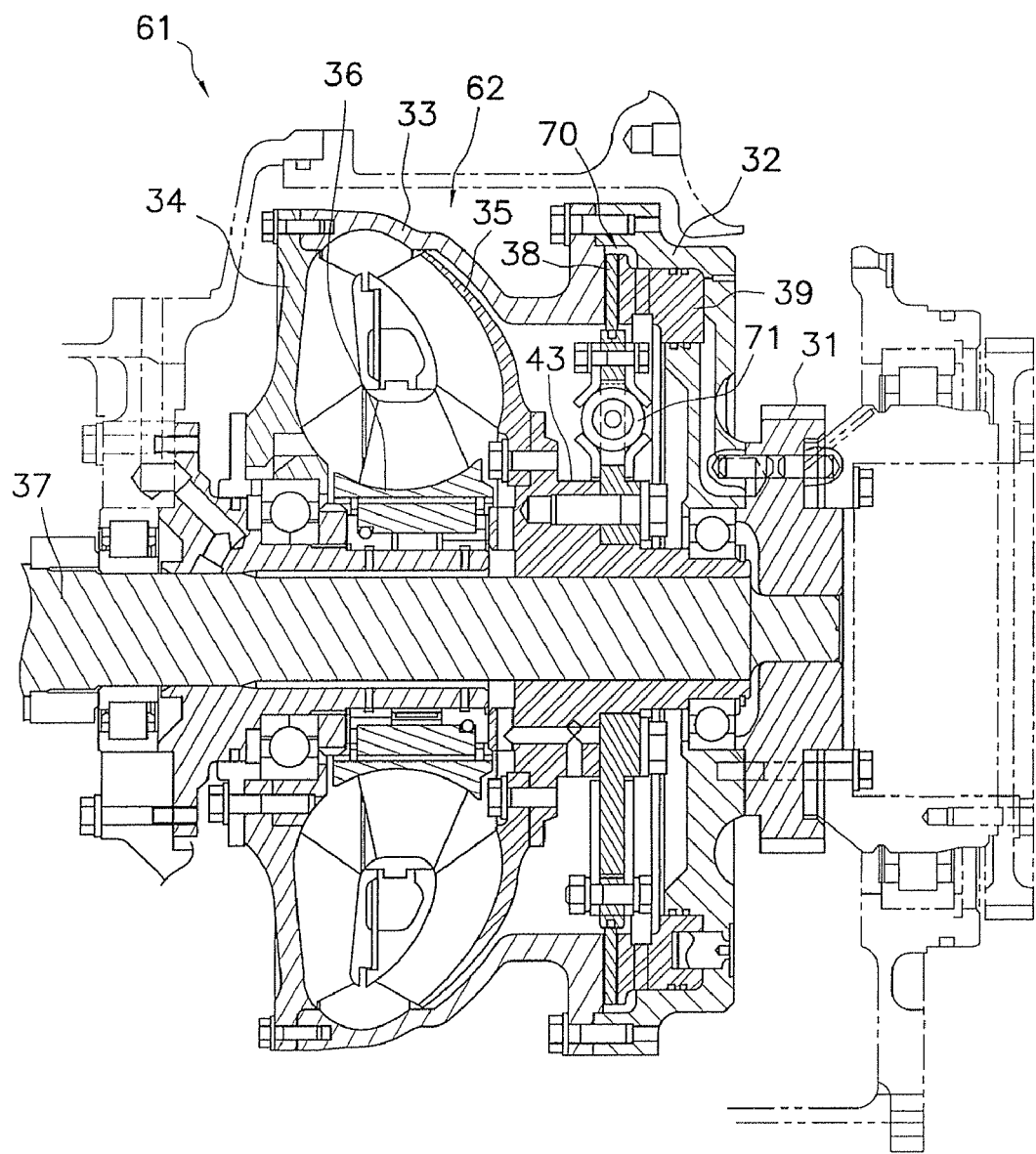
FIG. 4 is a cross-sectional view of a torque converter.

As illustrated in FIG. 4, the torque converter mechanism 62 includes an input section 31, a clutch housing 32, a drive casing 33, a pump 34, a turbine 35, and a stator 36. When the lock-up clutch 70 is set to be in a disengaged state, the torque converter mechanism 62 is configured to function as a normal torque converter. Specifically, the driving force from the engine 5 is transmitted to the drive casing 33 through the input section 31 and the clutch housing 32 for unitarily rotating the drive casing 33 and the pump 34. The driving force, transmitted to the pump 34, is further transmitted to the turbine 35 through oil as medium. The driving force is subsequently transmitted from an output unit 43 of the turbine 35 to an input shaft 37 of the transmission 60 coupled to the turbine 35. It should be noted that the front end (i.e., a right end in FIG. 4) of the input shaft 37 is configured to be rotatable with respect to the input section 31.

The lock-up clutch 70 includes a clutch disc 38 and a piston 39. The lock-up clutch 70 is set to be in an engaged state when the piston 39 is pressed onto the clutch disc 38. In this case, the driving force from the engine 5 is directly transmitted to the output section 43 of the turbine 35 through a set of the input section 31 and the clutch housing 32, a set of the piston 39 and the drive casing 33, the clutch disc 38, and the damper 71. The driving force is subsequently transmitted to the input shaft 37 of the transmission 60 from the output section 43 of the turbine 35.

It should be noted that the lock-up clutch 70 is set to be in a disengaged state when the piston 39 and the clutch disc 38 are separated from each other.

The damper 71 is disposed between the clutch disc 38 and the turbine 35. The damper 71 is configured to inhibit vibration to be transmitted from the engine 5 to the input shaft 37 of the transmission 60 when the lock-up clutch 70 is set to be in an engaged state.

The transmission 60 includes a variety of clutches 63 to 69, a plurality of transmission gears (not illustrated in the figure), and the like.

A variety of the clutches 63 to 69 are hydraulic clutches to be driven by means of pressure of hydraulic oil to be supplied thereto from a second hydraulic pump 72 to be described. A variety of the clutches 63 to 69 are, for instance, a FL clutch 63, a FH clutch 64, a R clutch 65, a 1st clutch 66, a 2nd clutch 67, a 3rd clutch 68, and a 4th clutch 69. Each of the FL clutch 63 and the FH clutch 64 is set to be in an engaged state when the vehicle is forwardly moved. In contrast, the R clutch 65 is set to be in an engaged state when the vehicle is reversely moved. Each of the 1st clutch 66, the 2nd clutch 67, the 3rd clutch 68, and the 4th clutch 69 is set to be in an engaged state for transmitting driving force to a transmission gear corresponding thereto. In the transmission 60, one of the first to eighth forward speed stages is selectable in forwardly travelling depending on combinations of either the FL clutch 63 or the FH clutch 64 and one of the 1st to 4th clutches 66 to 69. On the other hand, one of the first to fourth rear speed stages is selectable in reversely travelling depending on combinations of the R clutch 65 and one of the 1st to 4th clutches 66 to 69.

It should be noted that an input shaft revolution sensor 82 is configured to detect revolution of the input shaft to be transmitted to the FL clutch 63 and the FH clutch 64 and the detected revolution is configured to be transmitted to the control unit 8 as a detection signal. Further, an intermediate shall revolution sensor 82 is configured to detect revolution of an intermediate shaft between the FL and FH clutches 63, 64 and the 1st to 4th clutches 66 to 69, and the detected revolution is configured to be transmitted to the control unit 8 as a detection signal. Yet further, an output shaft revolution sensor 82 is configured to detect revolution of the output shaft transmitted from the 1st to 4th clutches 66 to 69, and the detected revolution is configured to be transmitted to the control unit 8 as a detection signal.

Travel Mechanism 9

The travel mechanism 9 is a mechanism configured to allow the vehicle to travel using the driving force from the engine 5. The driving force from the engine 5 is transmitted to the travel mechanism 9 through the power transmission mechanism 6. The travel mechanism 9 includes a final speed reducer (not illustrated in the figure), a tandem device 19, and the rear wheels 12. Driving force, outputted from the transmission 60, is transmitted to the rear wheels 12 through the final speed reducer and the tandem device 19. The rear wheels 12 are thereby rotationally driven and the vehicle accordingly travels.

Hydraulic Drive Mechanism 7

The hydraulic drive mechanism 7 is a mechanism configured to generate hydraulic pressure by means of the driving force from the engine 5 for driving the aforementioned components including a variety of the clutches 63 to 70, the hydraulic motor 49, and a variety of the cylinders 44 to 48 by means of the generated hydraulic pressure. The hydraulic drive mechanism 7 includes the first hydraulic pump 79, the second hydraulic pump 72, and a variety of hydraulic control valves 73 to 78 and 50 to 57.

The first hydraulic pump 79 is driven by means of the driving force from the engine 5 for generating hydraulic pressure to be supplied to each of a variety of the cylinders 44 to 48 and the hydraulic motor 49. The first hydraulic pump 79 is a capacity variable hydraulic pump configured to change the capacity of hydraulic oil to be discharged therefrom. The hydraulic oil capacity herein depends on the slanted angle of a swash plate of the first hydraulic pump 79 to be changed by a pump capacity control cylinder 79a.

The second hydraulic pump 72 is driven by means of the driving force from the engine 5 for generating hydraulic pressure to be supplied to each of a variety of the clutches 63 to 70.

A variety of the hydraulic control valves 73 to 78 and 50 to 57 are electromagnetic proportional control valves configured to be electrically controlled by the control unit 8 for regulating hydraulic pressure. A variety of the hydraulic control valves 73 to 78 and 50 to 57 are, for instance, first to fifth cylinder control valves 73 to 77, a hydraulic motor control valve 78, a lock-up clutch control valve 50, and first to seventh clutch control valves 51 to 57.

Each of the first to fifth cylinder control valves 73 to 77 is configured to regulate hydraulic pressure to be supplied to a corresponding one of a variety of the aforementioned cylinders 44 to 48. Further, hydraulic pressure to be supplied to each of a variety of the cylinders 44 to 48 is detected by a hydraulic sensor (not illustrated in the figure), and the detected hydraulic pressure is transmitted to the control unit 8 as a detection signal.

The hydraulic motor control valve 78 is configured to regulate hydraulic pressure to be supplied to the aforementioned hydraulic motor 49.

The lock-up clutch control valve 50 is configured to regulate hydraulic pressure to be supplied to the aforementioned lock-up clutch 70. Each of the first to seventh clutch control valves 51 to 57 is configured to regulate hydraulic pressure to be supplied to a corresponding one of a variety of the aforementioned clutches 63 to 69. Specifically, the first clutch control valve 51 is configured to regulate hydraulic pressure to be supplied to the FL clutch 63. The second clutch control valve 52 is configured to regulate hydraulic pressure to be supplied to the FH clutch 64. The third clutch control valve 53 is configured to regulate hydraulic pressure to be supplied to the R clutch 65. The fourth clutch control valve 54 is configured to regulate hydraulic pressure to be supplied to the 1st clutch 66. The fifth clutch control valve 55 is configured to regulate hydraulic pressure to be supplied to the 2nd clutch 67. The sixth clutch control valve 56 is configured to regulate hydraulic pressure to be supplied to the 3rd clutch 68. The seventh clutch control valve 57 is configured to regulate hydraulic pressure to be supplied to the 4th clutch 69.

Further, hydraulic pressure to be supplied to each of a variety of the clutches 63 to 70 is detected by a hydraulic sensor, and the detected hydraulic pressure is transmitted to the control unit 8 as a detection signal. It should be noted that FIG. 3 only illustrates a hydraulic sensors 84 configured to detect hydraulic pressure to be supplied to the FL clutch 63 and a hydraulic sensor 85 configured to detect hydraulic pressure to be supplied to the clutch 64 without illustrating the rest of the hydraulic sensors.

Operation Unit 10

The operation unit 10 is a unit operated by an operator for controlling travel of the motor grader 1 and actions of the working equipment 4. The operation unit 10 includes operation members such as the accelerator pedal 14, the inching pedal 13, a gear shift lever 17, and a mode changer switch 18. The accelerator pedal 14 is an operation member for setting engine revolution to be a desired revolution. The inching pedal 13 is an operation member to be operated for reducing the vehicle speed by causing slippage of the FL clutch 63 or the FH clutch 64. The gear shift lever 17 is an operation member for executing gear shifting in the transmission 60. The mode changer switch 18 is an operation member configured to selectively switch a gear shift mode of the power transmission mechanism 6 between a manual mode and a torqcon mode. The manual mode and the torqcon mode will be described below. When the operation members of the operation unit 10 are operated, operation signals corresponding to the operations are transmitted to the control unit 8.

Control Unit 8

For controlling the working equipment 4, the control unit 8 is configured to control the first to fifth cylinder control valves 73 to 77 and the hydraulic motor control valve 78 based on an operation signal from the operation unit 10 and detection signals from a variety of sensors. For example, the control unit 8 is configured to transmit a command signal to each of the first and second cylinder control valves 73, 74 for controlling hydraulic pressure to be supplied to each of the lift cylinders 44, 45. The blade 42 is thereby allowed to move in the vertical direction.

The control unit 8 is configured to determine the amount of fuel to be supplied to the engine 5 based on an operation signal from the accelerator pedal 14 and engine revolution detected by the engine revolution sensor 80. The control unit 8 then transmits a command signal corresponding to the determined fuel supply amount to the electronic governor 16. The amount of fuel to be injected from the fuel injection pump is accordingly regulated to be matched with the operation amount of the accelerator pedal 14. The engine revolution is consequently controlled. With the configuration, an operator is allowed to control output of the working equipment 4 and the vehicle speed.

The control unit 8 is configured to transmit a command signal to the lock-up clutch control valve 50 for increasing or reducing the hydraulic pressure of the lock-up clutch 70. The lock-up clutch 70 can be thereby switched between the engaged state and the disengaged state.

Further, the control unit 8 is configured to selectively switch the gear shift mode of the power transmission mechanism 6 between the manual mode and the torqcon mode based on an operation signal from the mode changer switch 18. In the manual mode, the lock-up clutch 70 is set to be in an engaged state. In this case, an operator is allowed to manually executing gear shifting of the transmission 60 by operating the gear shift lever 17. In the torqcon mode, in contrast, the lock-up clutch 70 is set to be in a disengaged state. Accordingly, the driving force from the engine 5 is transmitted to the transmission 60 through the torque converter mechanism 62. An operator is herein allowed to manually execute gear shifting of the transmission 60 among lower speed stages (e.g., forward first to fourth speed stages) by operating the gear shift lever 17. The lock-up clutch 70 is kept to be in a disengaged state at the lower speed stages regardless of the vehicle speed and the engine revolution. In the torqcon mode, the control unit 8 is configured to automatically execute gear shifting of the transmission 60 among the higher speed stages (e.g., forward fifth to eighth speed stages) depending on the vehicle speed and the engine revolution. In this case, the lock-up clutch 70 is configured to be automatically switched to be in the engaged state when the vehicle speed is increased and slippage is accordingly reduced in the torque converter mechanism 62.

It should be noted that the control unit 8 is configured to control the first to seventh clutch control valves 51 to 57 based on an operation signal from the operation unit 10 and detection signals from a variety of sensors and thereby execute gear shifting of the transmission 60. For example, the control unit 8 transmits a command signal to the first clutch control valve 51 for supplying hydraulic pressure to the FL clutch 63. Simultaneously, the control unit 8 transmits a command signal to the seventh clutch control valve 57 for supplying hydraulic pressure to the 4th clutch 69. The FL clutch 63 and the 4th clutch 69 are accordingly set to be in the engaged states. The seventh speed stage is thereby selectable. As another example, the control unit 8 transmits a command signal to the second clutch control valve 52 for supplying hydraulic pressure to the FH clutch 64. Simultaneously, the control unit 8 transmits a command signal to the fourth clutch control valve 54 for supplying hydraulic pressure to the 1st clutch 66. The FH clutch 64 and the 1st clutch 66 are accordingly set to be in the engaged states. The second speed stage is thereby selectable.

When the inching pedal 13 is operated, the control unit 8 is configured to regulate a command signal to be transmitted to the first clutch control valve 51 (or the second clutch control valve 52) based on an operation signal from the inching pedal 13 for reducing hydraulic pressure to be supplied to the FL clutch 63 (or the FH clutch 64). In other words, the surface pressure of the currently engaged FL clutch 63 (or the FH clutch 64) is reduced for causing clutch slippage. Clutch slippage reduces the driving force to be transmitted from the power transmission mechanism 6 to the travel mechanism 9. The vehicle speed is accordingly reduced. Therefore, an operator is allowed to regulate the vehicle speed by operating the inching pedal 13 under the condition that the output of the working equipment 4 is kept at a predetermined level while reduction in the engine revolution is inhibited.

Further, the control unit 8 is configured to execute engine stall avoidance control for avoiding engine stall during low speed travel in the manual mode. The engine stall avoidance control will be hereinafter explained.

Engine Stall Avoidance Control

Under the engine stall avoidance control, the control unit 8 is configured to keep the state of the lock-up clutch 70 currently set to be in the engaged state when the engine revolution is greater than a predetermined lock-up release revolution. The lock-up release revolution can be uniquely set for each of the speed stages. The lock-up release revolution is less than a low idle revolution but greater than a resonance revolution of the aforementioned damper 71. Resonance of the damper 71 is caused by relations among the damper 71, engine output torque, and inertia. The vehicle body is vibrated by excessive resonance torque. Further, the excessive resonance torque reduces duration of the drive train. Resonance of the damper may not be caused until occurrence of an engine stall and therefore excessive resonance torque may not be produced depending on relations among the damper 71, engine output torque and inertia. In this case, the lock-up release revolution may be arbitrarily set in consideration of operability as long as the lock-up release revolution is less than the low idle revolution and greater than the engine revolution immediately before occurrence of an engine stall.

Figure 5:
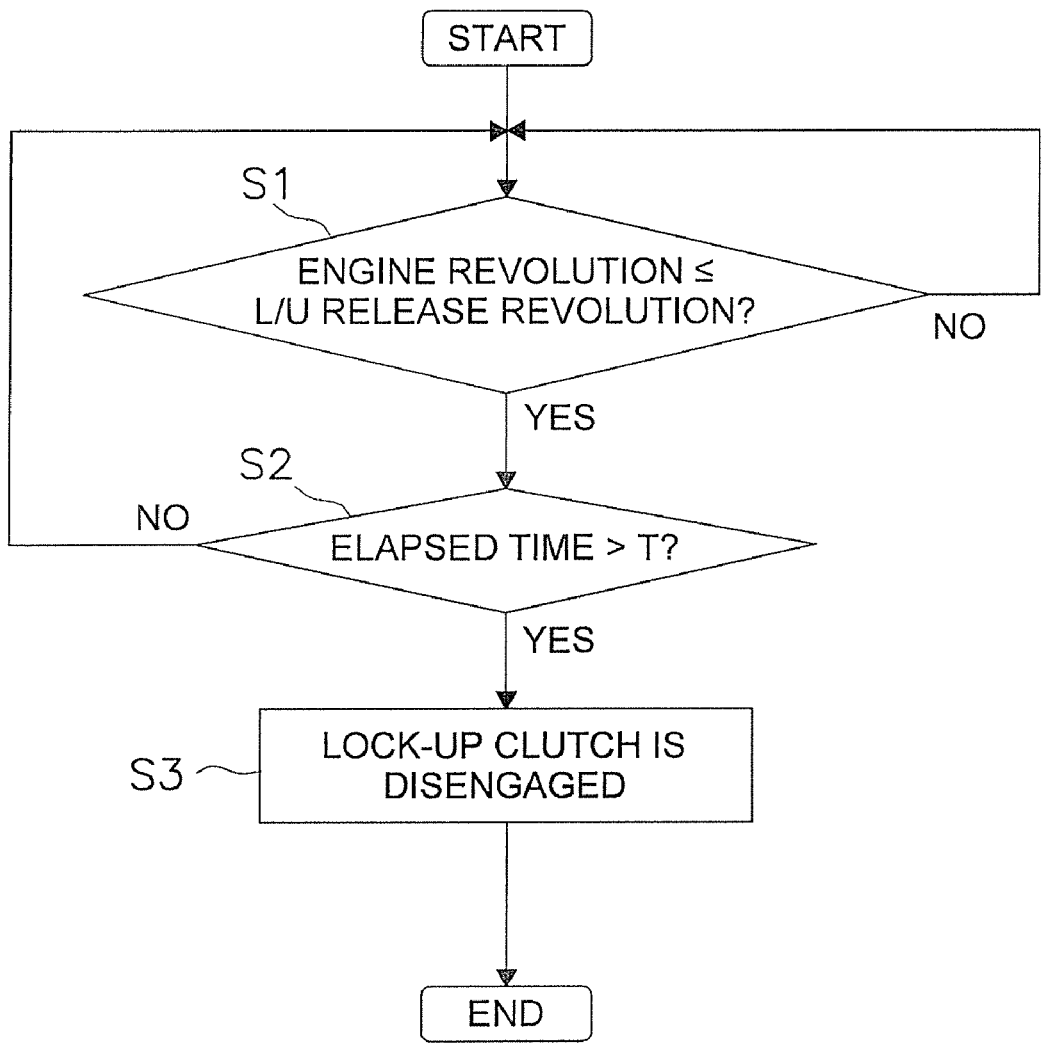
FIG. 5 is a flow chart of an engine stall avoidance control.

Under the engine stall avoidance control, the lock-up clutch 70 is configured to be kept in en engaged state until the engine revolution is reduced to the lock-up release revolution even when the engine revolution is reduced to be less than or equal to the low idle revolution. The control unit 8 is configured to switch the lock-up clutch 70 into the disengaged state when the engine revolution is further reduced to be less than or equal to the lock-up release revolution. More specifically, it is determined whether or not the engine revolution is less than or equal to the lock-up release revolution in Step S1 as illustrated in FIG. 5. When it is determined that the engine revolution is less than or equal to the lock-up release revolution, it is then determined whether or not an elapsed time is greater than a predetermined period of time T in Step S2. In other words, it is herein determined whether or not a period of time, elapsed after the engine revolution becomes less than or equal to the lock-up release revolution, exceeds the predetermined period of time T. The predetermined period of time T is herein a short period of time, for instance, roughly tens of milliseconds. The predetermined period of time T is set for purposes such as avoidance of false detection by the engine revolution sensor 80. When it is determined that the elapsed time exceeds the predetermined period of time T, the lock-up clutch 70 is switched into the disengaged state in Step S3.

When predetermined returning conditions are all satisfied after the lock-up clutch 70 is switched into the disengaged state under the engine stall avoidance control, the control unit 8 is configured to return the lock-up clutch 70 to the engaged state. For example, the returning conditions include the following first to third returning conditions.

The first returning condition: the input shaft revolution of the transmission 60≧a returning revolution setting value In the first returning condition, "the input shaft revolution of the transmission 60" is detected by the input shaft revolution sensor 81. "The returning revolution setting value" is a predetermined constant uniquely determined for each of the speed stages. Further, it is preferable to set "the returning revolution setting value" to be a predetermined engine revolution greater than the low idle revolution. The configuration of "the returning revolution setting value" prevents the lock-up clutch 70 from being disengaged under the engine stall avoidance control immediately after the lock-up clutch 70 is returned to the engaged state The second returning condition: an elapsed time>a returning prevention time setting value In the second returning condition, "the elapsed time" refers to a period of time elapsed after the first returning condition is satisfied. On the other hand, "the returning prevention time setting value" is a predetermined constant to be determined in consideration of hunching prevention.

The third returning condition: a L/U relative revolution<a disengaged state keeping setting value In the third returning condition, "the L/U relative revolution" refers to a relative revolution between revolution on the input side and revolution on the output side in the lock-up clutch 70. Therefore, "the L/U relative revolution" can be obtained from difference between the input shaft revolution of the transmission 60 and the engine revolution. On the other hand, "the disengaged state keeping setting value" is a predetermined constant to be determined in consideration of protection of the lock-up clutch 70 and shock to be caused in engaging the lock-up clutch 70.

It should be noted that either the intermediate shaft revolution (to be detected by the intermediate shaft revolution sensor 82) or the output shaft revolution (to be detected by the output shaft revolution sensor 83) in the transmission 60 may be used instead of the input shaft revolution of the transmission 60 in the first returning condition. Alternatively, the engine revolution may be used. When either the intermediate shaft revolution or the output shaft revolution is herein used, "the returning revolution setting value" can be determined in consideration of the transmission ratio of the transmission 60. When the engine revolution is herein used, on the other hand, "the returning revolution setting value" can be determined in consideration of the L/U relative revolution.

According to the motor grader 1, occurrence of an engine stall and vibration of the vehicle body are avoided under the engine stall avoidance control even when increase in load reduces the engine revolution while the lock-up clutch 70 is set to be in the engaged state, for instance, during travel in the manual mode. Further, reduction in duration of the drive train can be avoided. Yet further, the lock-up clutch 70 is herein kept to be in the engaged state under the engine avoidance control until the engine revolution reaches the lock-up release revolution even when the engine revolution is reduced. Therefore, an operator is allowed to operate the vehicle under the condition that the lock-up clutch 70 is kept to be in the engaged state even during low speed travel at an engine revolution lower than or equal to the low idle revolution. For example, the following case is assumed. At the forward first speed stage, the vehicle speed is 1.3 km/h where the engine revolution corresponds to the low idle revolution. In this case, the lock-up clutch 70 is kept to be in the engaged state even when the vehicle speed is 1.0 km/h. Accordingly, deterioration of a speed control feeling of an operator can be prevented during low speed travel.

According to the illustrated embodiment, occurrence of an engine stall can be avoided without deteriorating a speed control feeling of an operator during low speed travelling. Therefore, the present invention is useful for the motor graders.

The invention claimed is:
1. A motor grader comprising:
an engine;
a torque converter configured to transmit a driving force from the engine, the torque converter including a lock-up clutch;
a drive wheel configured to be rotationally driven by the driving force from the engine;
an engine revolution detector configured to detect an engine revolution; and
a control unit configured to keep an engaged state of the lock-up clutch when the engine revolution is greater than a predetermined lock-up release revolution lower than a low idle revolution under a condition that the lock-up clutch is set to be in the engaged state, the control unit being configured to switch the lock-up clutch into a disengaged state when the engine revolution is less than or equal to the predetermined lock-up release revolution.

2. The motor grader according to claim 1, wherein
the torque converter further includes a damper configured to inhibit vibration of the engine, and
the lock-up release revolution is greater than a resonance revolution of the damper.

3. The motor grader according to claim 1, wherein
the control unit is configured to switch the lock-up clutch into the engaged state when the engine revolution is greater than or equal to a predetermined returning revolution under a condition that the lock-up clutch is set to be in the disengaged state.

4. The motor grader according to claim 3, wherein
the predetermined returning revolution is greater than the low idle revolution.

\* \* \* \* \*